United States Patent
Billman

(10) Patent No.: US 11,961,048 B1
(45) Date of Patent: Apr. 16, 2024

(54) VISITOR MONITORING AND SECURITY

(71) Applicant: UIPCO, LLC, San Antonio, TX (US)

(72) Inventor: Bradly Jay Billman, Celina, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 234 days.

(21) Appl. No.: 17/504,803

(22) Filed: Oct. 19, 2021

(51) Int. Cl.
G06Q 10/1093 (2023.01)
G06K 7/14 (2006.01)
G06K 19/06 (2006.01)
H04L 9/08 (2006.01)

(52) U.S. Cl.
CPC ....... *G06Q 10/1095* (2013.01); *G06K 7/1413* (2013.01); *G06K 7/1417* (2013.01); *G06K 19/06028* (2013.01); *G06K 19/06037* (2013.01); *H04L 9/0894* (2013.01)

(58) Field of Classification Search
CPC .......... G06Q 10/00–50/00; G06K 1/00–21/00; H04L 1/00–2209/00
USPC ............................................... 705/7.11–7.42
See application file for complete search history.

(56) References Cited

U.S. PATENT DOCUMENTS

| | | | |
|---|---|---|---|
| 6,668,322 B1 * | 12/2003 | Wood ...................... | G06F 21/41 713/182 |
| 9,875,590 B2 * | 1/2018 | Schmidt-Lackner ........................ | G07C 9/00571 |
| 10,325,426 B2 * | 6/2019 | Schmidt-Lackner ........................ | G06Q 30/06 |
| 10,839,631 B1 * | 11/2020 | LaRovere ................ | G07C 1/32 |
| 11,062,543 B2 * | 7/2021 | Novozhenets ...... | H04W 12/043 |
| 11,501,590 B2 * | 11/2022 | LaRovere ................ | G07C 1/32 |
| 2007/0273474 A1 * | 11/2007 | Levine .................... | G05B 15/02 340/5.28 |
| 2013/0036459 A1 * | 2/2013 | Liberman ............. | H04L 9/0866 726/6 |
| 2014/0233855 A1 * | 8/2014 | Clarke .................. | G06F 16/583 707/769 |
| 2015/0120015 A1 * | 4/2015 | Fadell ..................... | G05B 15/02 700/90 |
| 2015/0302674 A1 * | 10/2015 | Kuruba ..................... | G07C 9/38 340/5.54 |
| 2016/0080390 A1 * | 3/2016 | Kalb ...................... | G06Q 50/01 726/4 |
| 2017/0093836 A1 * | 3/2017 | Neafsey ............. | G07C 9/00182 |
| 2018/0322352 A1 * | 11/2018 | Phillips ................. | H04W 4/029 |
| 2021/0134100 A1 * | 5/2021 | LaRovere .......... | G07C 9/00571 |
| 2022/0262184 A1 * | 8/2022 | Kwok ..................... | G07C 9/20 |

* cited by examiner

*Primary Examiner* — Alan S Miller
(74) *Attorney, Agent, or Firm* — Plumsea Law Group, LLC

(57) ABSTRACT

A system and method for home security, and in particular to notifying residents of a home of a visitor's presence and providing an automatic assessment of the visitor's legitimacy, is disclosed. In one example, the system can be configured to automatically identify a logo worn by the visitor using optical recognition and generate a notification for the resident that identifies the company. In another example, the system can request presentation of an encrypted key that should be stored on the visitor's computing device. In another example, the system can query a database of scheduled services and determine if a person was requested or scheduled for a visit. In some embodiments, the system can assign a security token to the merchant which will be required at the time of the appointment.

20 Claims, 14 Drawing Sheets

VISITOR MONITORING AND SECURITY

TECHNICAL FIELD

The present disclosure generally relates to security monitoring and notification techniques, and in particular to a system and method for determining whether a visitor should be permitted to access a property based on an identification factor.

BACKGROUND

Home security systems allow users to receive various information related to their homes and activity in and around their homes. For instance, when motion is detected at a home, a home automation system may send a notification to a user informing him of the motion. Such information can be useful to the user, such as if he was not expecting any motion or visitors while he was away from home. For example, if a stranger is detected on video, a user may ask for a notification. However, many people may visit a user's property with a wide range of intentions. For instance, a visiting relative, friend, or tradesman may trigger a movement notification to be sent to a user, as well as solicitors, service personnel, delivery workers, and potential scammers.

The safety and security of residents or other occupants of a building—particularly those more vulnerable to visits from strangers such as children, persons with disabilities, or the elderly—is prime area of concern. There has been an increase in persons posing as repair mechanics or service personnel as well as other fraudulent and/or simply unwelcome door-to-door activity. While smart doorbells and other home security devices can alert users to the presence of a visitor, whether that visitor should be permitted access can be more ambiguous.

There is a need in the art for a system and method that addresses the shortcomings discussed above.

SUMMARY

In one aspect, a method of improving security for occupants of a property using an automated verification process is disclosed. A first step includes receiving, at a cloud-based secure scheduling system and from a first computing device for an occupant of a building, appointment data identifying an appointment scheduled for a visit by a representative of a first service provider to the building. The method also includes a second step of receiving, at the secure scheduling system and from the first computing device, a selection of a first verification process to be implemented with respect to the appointment, and a third step of automatically generating, at the secure scheduling system, a first verification token based on the selection of the first verification process. In addition, the method includes a fourth step of transmitting, from the secure scheduling system, the first verification token to a first visitor device associated with the first service provider, and a fifth step of receiving, at the secure scheduling system and from a second computing device installed at the building, a first verification request that includes first data captured at a first time by the second computing device while a first visitor was in sensor range of the second computing device. A sixth step includes determining, at the secure scheduling system, that the first data includes the first verification token, and a seventh step includes causing, via the secure scheduling system, a notification to be presented at the first computing device, the notification including a message indicating the first visitor corresponds to the representative.

In another aspect, a method of identifying visitors to a building is disclosed. The method includes a first step of receiving, at a secure verification system, a first image of a visitor captured by a camera of a first computing device installed on a first property at a first time, and a second step of recognizing, using image recognition software at the secure verification system, a first identification badge in the first image. A third step includes detecting, at the secure verification system, a logo displayed on the first identification badge, and a fourth step includes identifying, at the secure verification system, a first service provider associated with the logo. A fifth step includes causing, via the secure verification system, a notification to be presented at a second computing device associated with an occupant of the first building, the notification including a message identifying the first service provider.

In another aspect, a system for improving security for occupants of a property using an automated verification process includes a processor and machine-readable media including instructions which, when executed by the processor, cause the processor to receive, at a cloud-based secure scheduling system and from a first computing device for an occupant of a building, appointment data identifying an appointment scheduled for a visit by a representative of a first service provider to the building, and to receive, at the secure scheduling system and from the first computing device, a selection of a first verification process to be implemented with respect to the appointment. The instructions further cause the processor to automatically generate, at the secure scheduling system, a first verification token based on the selection of the first verification process, and to transmit, from the secure scheduling system, the first verification token to a first visitor device associated with the first service provider. In addition, the instructions cause the processor to receive, at the secure scheduling system and from a second computing device installed at the building, a first verification request that includes first data captured at a first time by the second computing device while a first visitor was in sensor range of the second computing device. Furthermore, the instructions cause the processor to determine, at the secure scheduling system, that the first data includes the first verification token, and to cause, via the secure scheduling system, a notification to be presented at the first computing device, the notification including a message indicating the first visitor corresponds to the representative.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF THE EMBODIMENTS

Figure 1A:
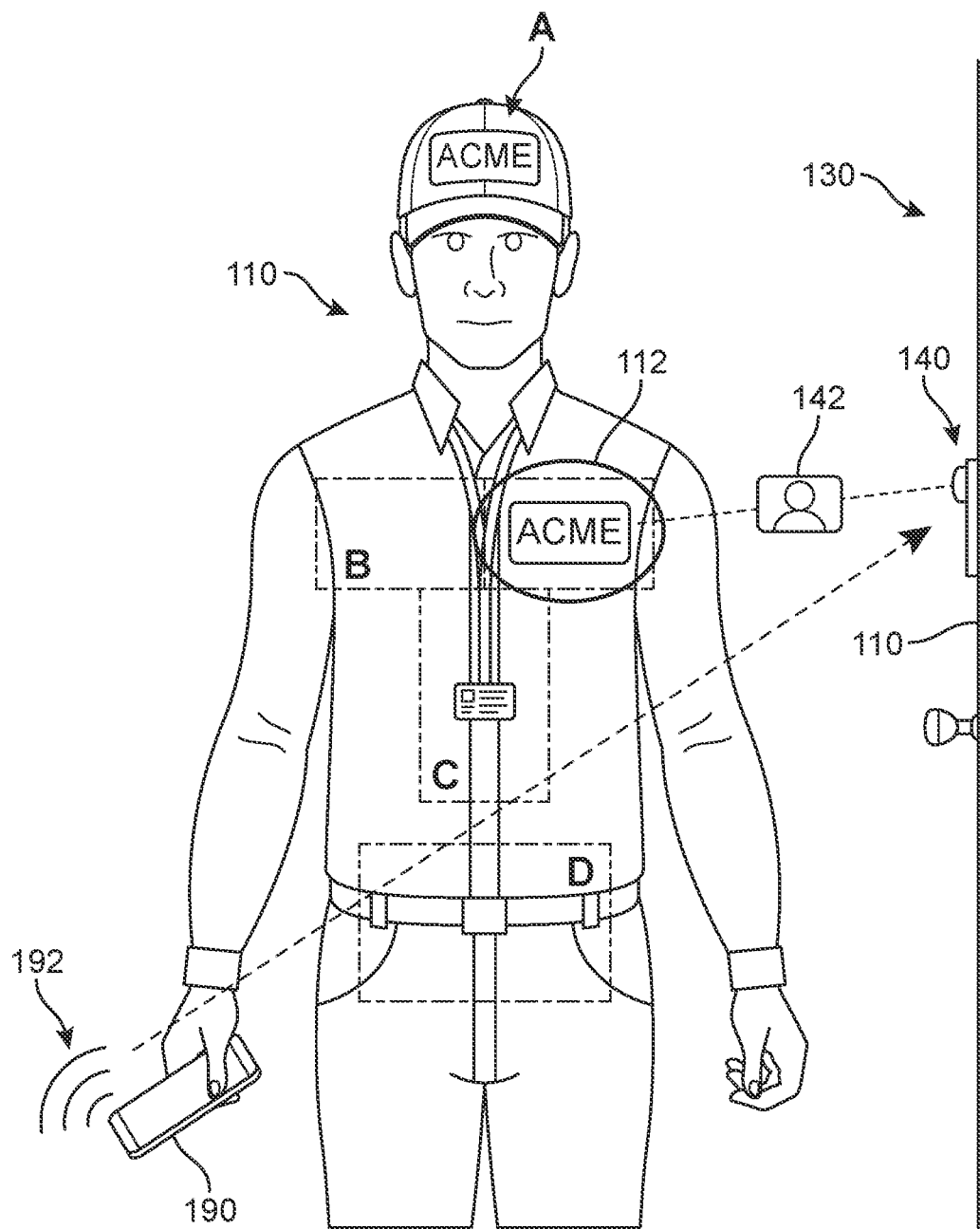
FIGS. 1A and 1B together depict an embodiment of a secure verification system identifying a sales representative based on an identification badge, according to an embodiment.

Door-to-door scams ("doorstep scams") are scams in which a con artist has a convincing, but fraudulent, story with the purpose of coming into a residence or other building and/or stealing money or gaining personal information for fraudulent purposes. In some cases, doorstep scams can be disguised as canvassing (e.g., political or social services), servicing (e.g., energy audits, outdoor home maintenance), and sales (e.g., magazine subscriptions, fundraisers). Doorstep scams are occurring more frequently, with elderly people being at greater risk of becoming victims. Doorstep scams often have a high emotional and economic impact. There are behavioral aspects of prevention of doorstep scams, such as opening a door with a chain on to prevent intrusion. However, residents can often be taken by surprise and/or have poor refusal assertiveness skills. When residents are at home, there tends to be a sense of safety that can increase their susceptibility to door callers. Although residents may be instructed only respond to the door if it is an expected call or they are a trusted friend or family member, occupants can feel pressured to greet visitors, and hesitant to express suspicion in face-to-face interactions. In particular, when purported technicians or sales persons arrive at the door wearing what appear to be uniforms and/or claim to work for a specific company, residents may not be aware of their own vulnerability. In some cases, the callers may greet the resident by name to seem friendly or to appear as if they know one another, but have simply read names off the mailbox or looked at property records to determine the owner's name. More generally, there are many occasions when unscheduled solicitors to a building are simply undesirable, regardless of their intentions being fraudulent or lawful.

The proposed embodiments describe a system and method for home security, and in particular to notifying residents of a home of a visitor's presence and providing an automatic assessment of the visitor's legitimacy. For purposes of this application, an illegitimate visitor refers to a visitor who either lacks any verifiable credentials or has invalid credentials, or cannot otherwise be identified by the system. In different embodiments, a visitor (such as a salesperson or technician) may arrive at a building, triggering the system's verification process via a doorbell camera. For example, the system can be configured to automatically identify a logo worn by the visitor using optical recognition. In another example, the system can request presentation of an encrypted key that would be stored on the solicitor's computing device. In another example, the system can query a database of scheduled services and determine if the person was requested by the resident or otherwise scheduled for a visit. In some embodiments, the system can assign a security verification token to the vendor at the time the visit is scheduled and request presentation of this token upon their arrival.

Figure 1B:
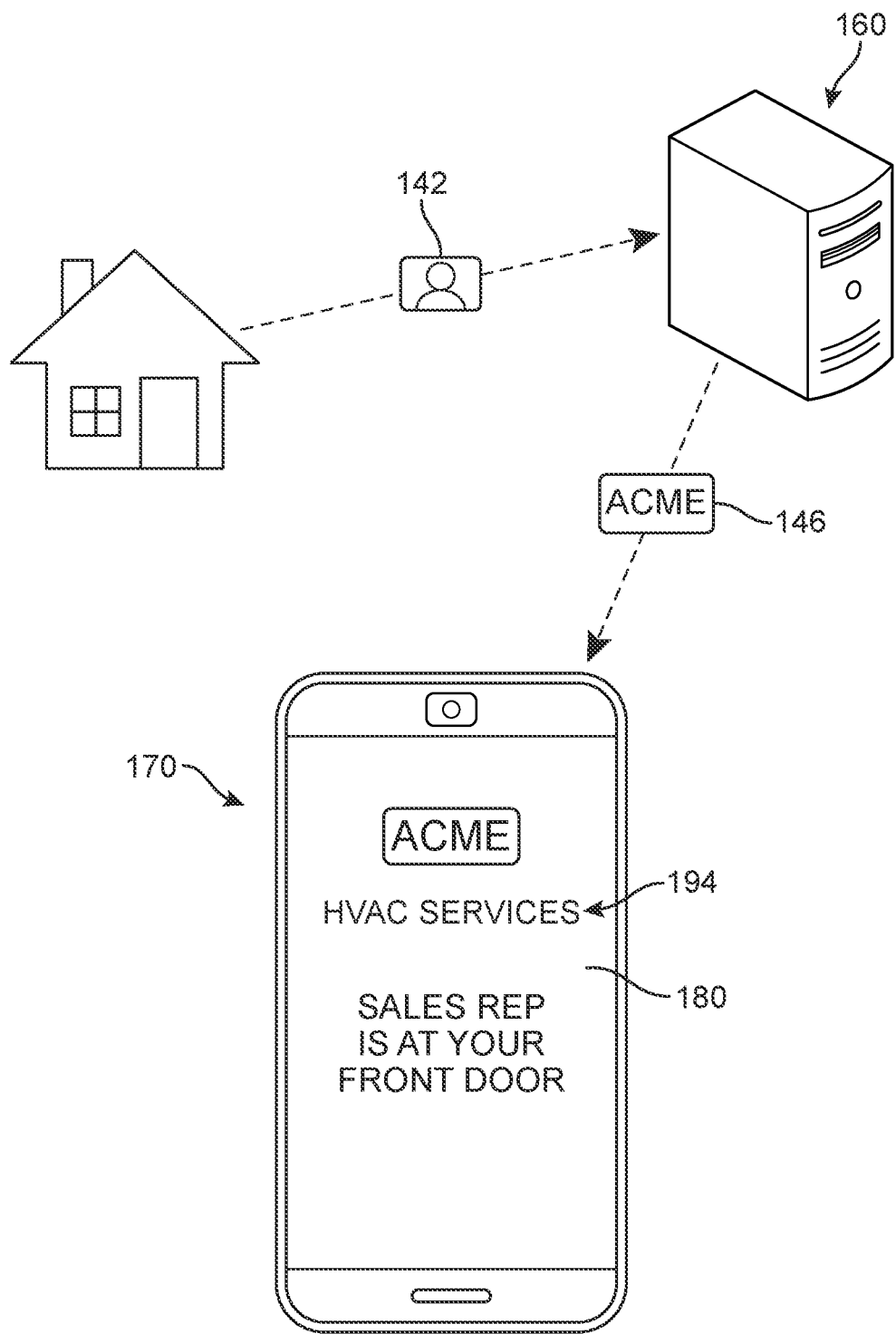

For purposes of clarity, an overview of one embodiment of the proposed systems and methods is illustrated with reference to FIGS. 1A and 1B. In FIG. 1A, a first visitor 110 has arrived at a front door 120 of a home 130. Near the front door 120 a first smart security device ("first device") 140 is installed. As the first visitor 110 approaches the door 120, the first device 140 detects his presence, for example via a motion sensor. In response, the system triggers a capture of image data 142 of first visitor 110 via the first device 140. The image data 142, as shown in FIG. 1B, is translated into a query that is transmitted via a network to a cloud-based security service 160 that searches for the presence of identifiers or apparel characteristics that correspond to a specific entity (e.g., a vendor, repair service, etc.) with reference to an identifier database 160. In some embodiments, the amount of processing power used to extract the logo (in this case a badge worn by the visitor) is minimized by focusing the detection on identification regions in the image. An example is shown in FIG. 1A, where a first box A, a second box B, a third box C, and a fourth box D have been superimposed on the first visitor 110. These boxes represent extraction zones that are automatically applied on the image once a forward-facing image of the person has been received. These zones correspond to the most common and likely regions where identification badges are worn (e.g., a hat, chest, lanyard hanging down, clipped to a belt). In other embodiments, these zones may be adjusted to reduce the number of zones, or to customize the size or location of the zone relative to a person's figure, or to remove the use of zones and use the image in its entirety.

Returning to FIG. 1B, in different embodiments, the security service 160 can determine the image data 142 includes a logo that is assigned to a specific company (shown here as "ACME"). Once the logo is verified, a response 146 is sent to the user's registered computing device (in this case a mobile phone 170), which can trigger presentation of a notification 180 that (a) advises the resident that there is a visitor at the door, and (b) there is a likelihood that the visitor is from ACME company. In other embodiments signal 146 can be a text message, or can cause the opening of the security management app associated with the first device 140.

In one embodiment, the identified company's category of business 194 ("HVAC Services") can also be displayed to better inform the resident. If there are multiple companies by the same name (e.g., an ACME bookstore, an ACME pet shop, an ACME HVAC company, etc.), the system can select the category based on the logo (if any) on the visitor's badge or clothing, or otherwise scan the visitor's apparel for any indications of the type or class of services provided by the visitor (e.g., a repairman might wear overalls, a salesman might wear a suit). In some cases, if a vehicle was used by the visitor and is visible (i.e., in the field of view) of the camera of first device 140, any logo or other identifying information displayed on the vehicle can also be scanned and used to identify the visitor and/or the company being represented.

In some embodiments, the first visitor 110 may alternatively or additionally transmit an identification signal 192 via a mobile phone 190. The first device 140 receives the identification signal 192 and conveys the identification signal 192 to the security service 160, which has access to a merchant signal identification repository. The signal is unique to the merchant, who has registered with the security service as a business client in order to store their signal for use with the service. In this example, the system identifies the signal as belonging to the ACME company, and the notification 180 is presented, in this case with an additional level of confidence. In different embodiments, the image sent from the security device to the security service further includes establishing whether the caller's arrival coincides with a visiting window that was previously scheduled, as will be discussed below.

Figure 2A:
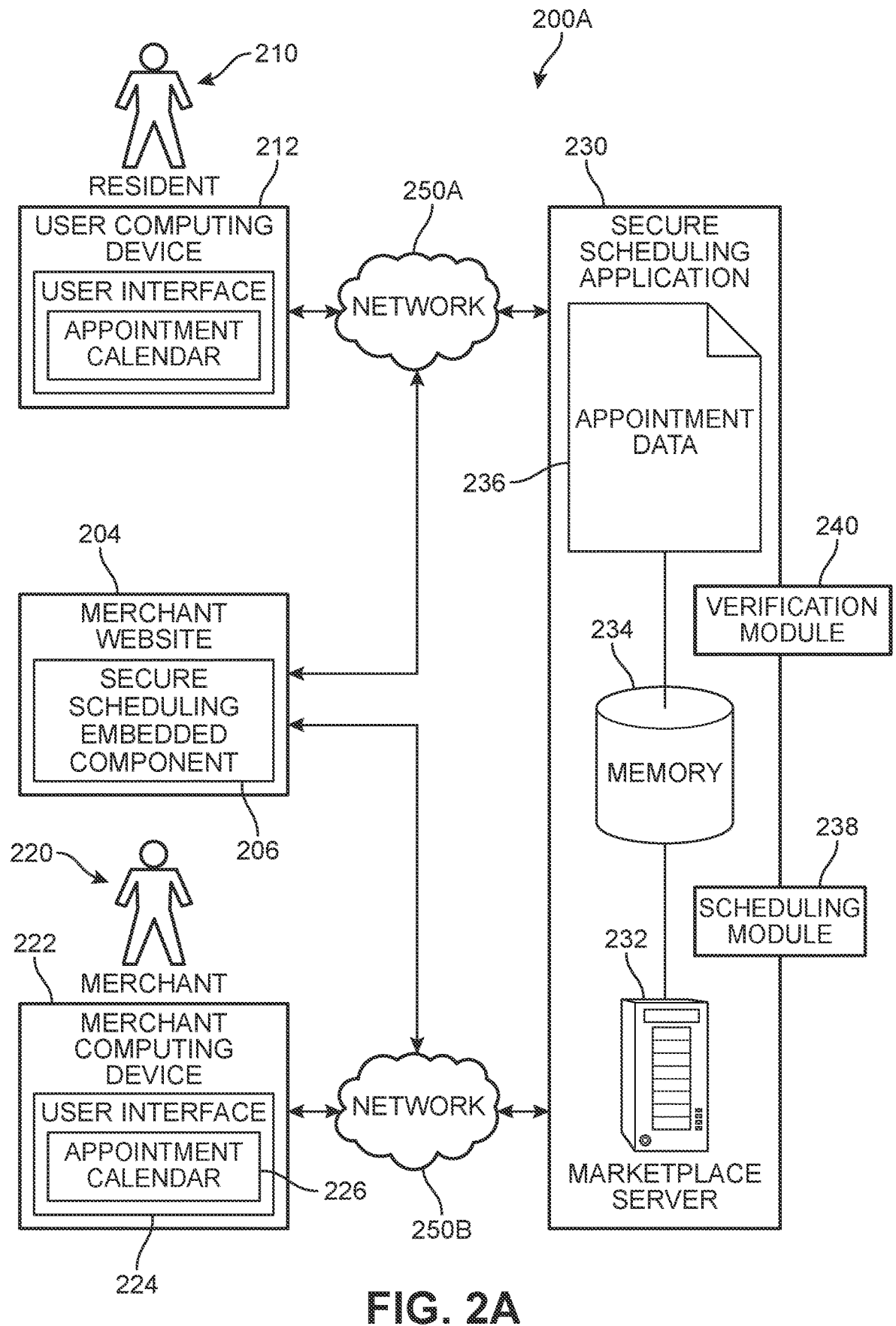
FIGS. 2A-2C collectively present a schematic framework for improving security of residents by verification of appointments and credentials, according to an embodiment.
Figure 2B:
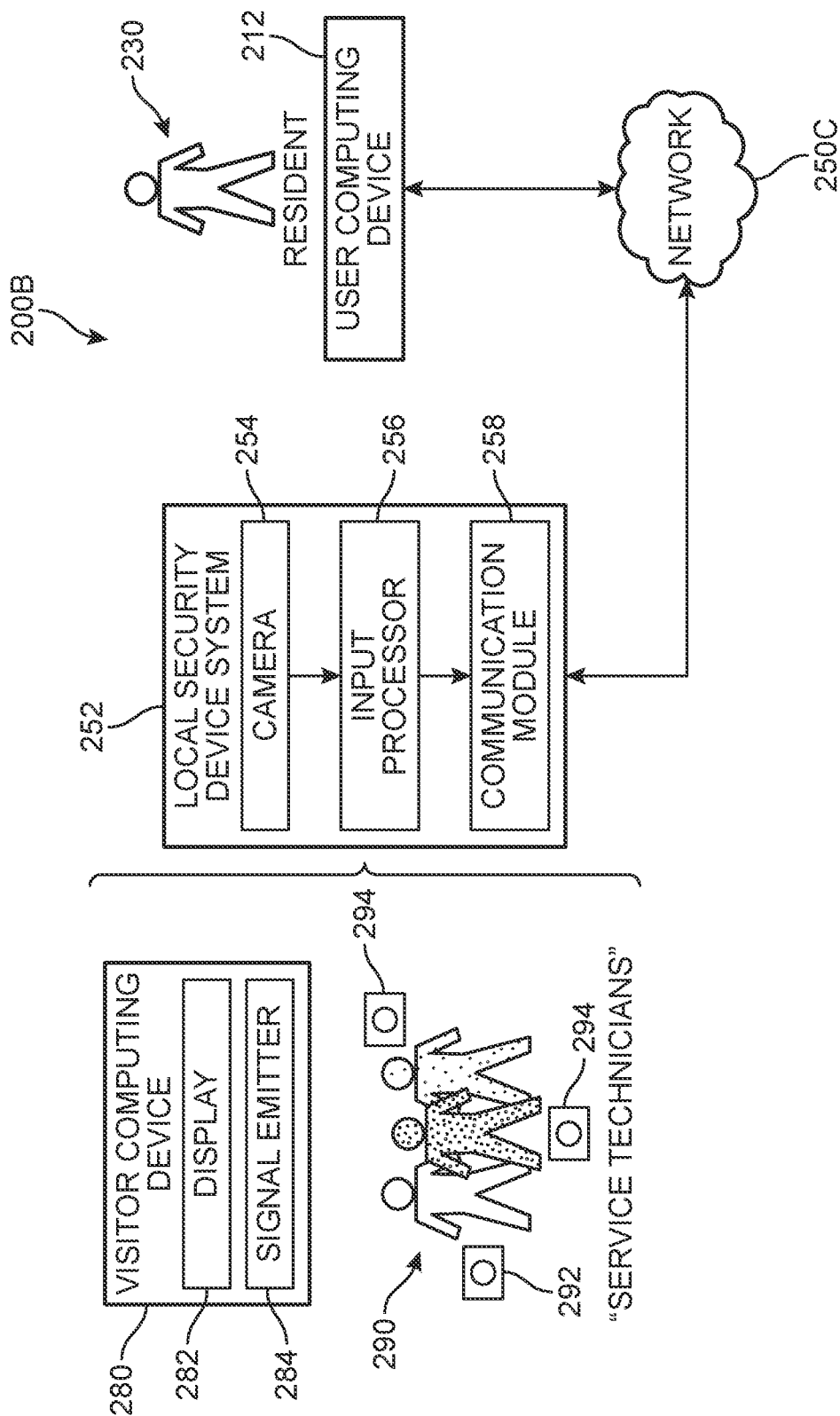
Figure 2C:
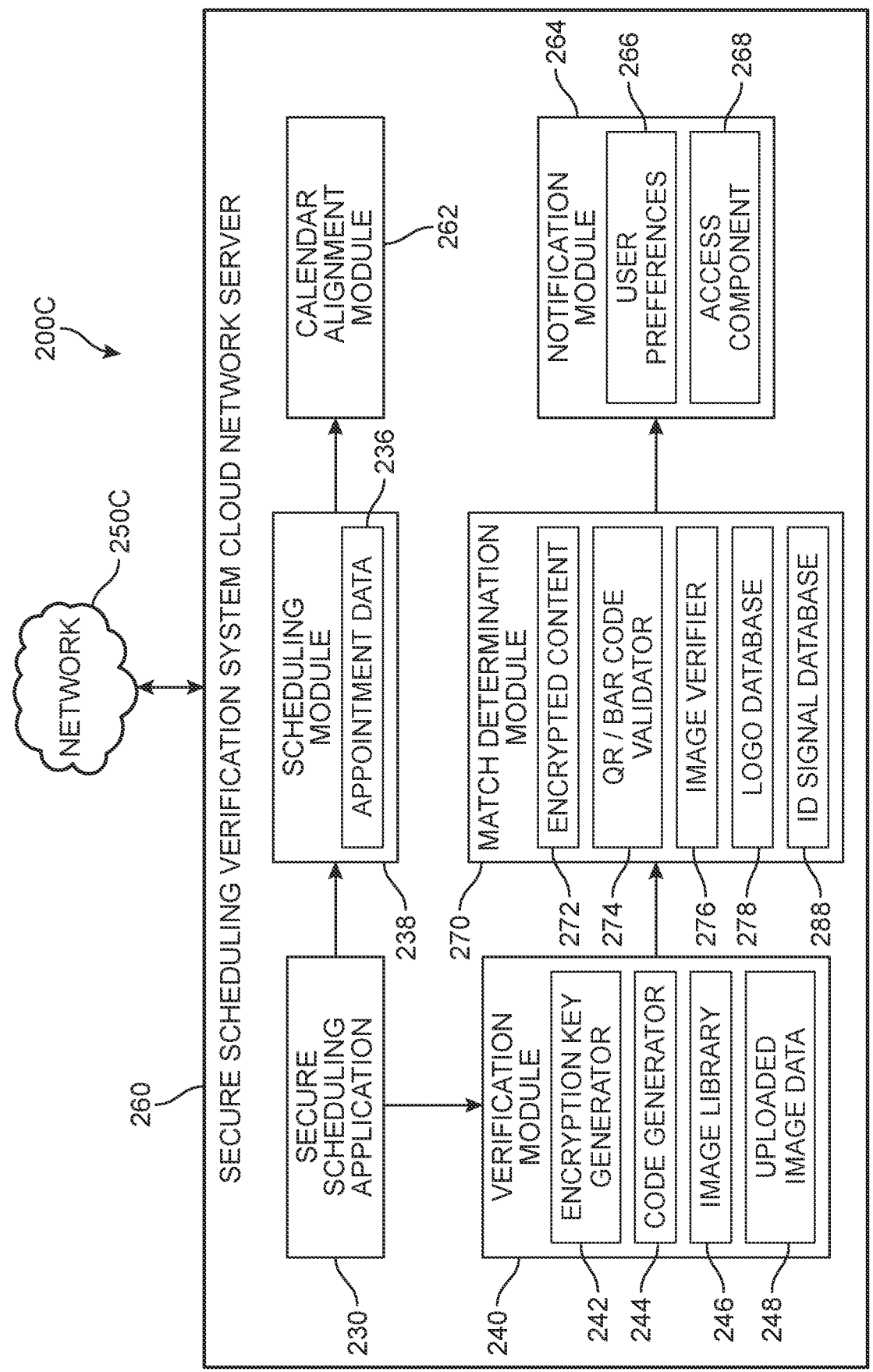

Referring now to FIGS. 2A, 2B, and 2C, a schematic diagram of an environment (200A, 200B, and 200C) presenting an embodiment of a security service framework is depicted. In different embodiments, some of the steps described herein may be performed by user (resident) computing system(s) 212, some by remote cloud-based servers (e.g., in conjunction with a secure scheduling application ("app") 230 over networks 250a, 250b, and 250c), and some of the steps may be performed by merchant/visitor computing systems 222.

As a general matter, some or all of the described functionality can be implemented in software and/or hardware on customer user device 212 or merchant's user device 222. A customer or merchant device can include, but is not limited to, a smart phone, smart watch, smart glasses, tablet computer, portable computer, television, gaming device, music player, mobile telephone, laptop, palmtop, smart or dumb terminal, network computer, personal digital assistant, wireless device, information appliance, workstation, minicomputer, mainframe computer, or other computing device, that is operated as a general purpose computer or a special purpose hardware device that can execute the functionality described herein. The software, for example, can be implemented on a general-purpose computing device in the form of a computer including a processing unit, a system memory, and a system bus that couples various system components including the system memory to the processing unit. Additionally, or alternatively, some or all of the functionality can be performed remotely, in the cloud, or via software-as-a-service. The remote functionality can execute on server class computers that have sufficient memory, data storage, and processing power and that run a server class operating system (e.g., Oracle® Solaris®, GNU/Linux®, and the Microsoft® Windows® family of operating systems, or other such systems).

In different embodiments, the customer user device 212 and/or merchant user device 222 include a web browser, native application, or both, that facilitates execution of the functionality described herein. A web browser allows the device to request a web page or other downloadable program, applet, or document (e.g., from the server(s)) with a web page request. One example of a web page is a data file that includes computer executable or interpretable information, graphics, sound, text, and/or video, that can be displayed, executed, played, processed, streamed, and/or stored and that can contain links, or pointers, to other web pages. In one implementation, a user of the device manually requests a web page from the server. Alternatively, the device automatically makes requests with the web browser. Non-limiting examples of commercially available web browser software include Microsoft® Internet Explorer®, Mozilla® Firefox®, and Apple® Safari®.

Furthermore, the customer user device 212 and/or merchant user device 222 can include client software. The client software provides functionality to the device that provides for the implementation and execution of the features described herein. The client software can be implemented in various forms, for example, it can be in the form of a native application, web page, widget, and/or Java, JavaScript, .Net, Silverlight, Flash, and/or other applet or plug-in that is downloaded to the device and runs in conjunction with the web browser. The client software and the web browser can be part of a single client-server interface; for example, the client software can be implemented as a plug-in to the web browser or to another framework or operating system. Other suitable client software architecture, including but not limited to widget frameworks and applet technology can also be employed with the client software.

FIG. 2A depicts environment 200A in which an end-user 210 initiates a secure appointment process via app 230, accessed by user computing device 212. In different embodiments, app 230 is configured to enable consumers to request goods or services using a marketplace 232. The marketplace 232 connects consumers such as end-user 210 with merchants 220 and professionals to buy and sell consumer services. An internet cloud-based hardware server(s) can offer a marketplace environment for the sourcing and marketing, sale and acquisition, delivery and acceptance, payment, feedback, and electronic digital archiving of consumer services. In addition, the marketplace can be integrated with a scheduling module application 238 where individual consumer's calendars are also maintained. The scheduling module application 238 can also be used by merchants 220 and service professionals to maintain complete operating schedules for all productive assets used to generate their service income. In some embodiments, the app 230 includes scheduling module application 238, while in other embodiments the scheduling module application 238 is externally accessed by app 230.

In different embodiments, end-user 210 schedules an appointment through a consumer user interface 214 for the app 230, where a scheduling module 238 which is configured to communicate with a merchant appointment calendar 226 to create the appointment, stored in memory 234 as appointment data 236. In different embodiments, appointment data 236 includes one or more of merchant schedules and consumer schedules, and can store newly created, pending, and past appointment actions (history).

In some embodiments, the merchant 220 can access their appointment data via business user interface 224. In other embodiments, the merchant 220 can integrate or embed a component 206 at their own merchant website 204 to enable the same secure appointment functionality outside the marketplace 232. Thus, in some embodiments, marketplace 232 is optional, and the proposed systems can be implemented as a cloud-service connecting the user computing device 212 and merchant computing device 222. In different embodiments, the scheduling module 238 (whether as part of app 230 or as a component 206) can be configured to provide fully automated, real-time scheduling, including receiving a scheduling and verification request, scheduling the service, confirming the appointment, sending appointment reminders in various formats, and sending requirements notifications and reminders.

Each computing device and system shown in FIGS. 2A-2C may include one or more processors and memory. Memory may comprise a non-transitory computer readable medium. Instructions stored within memory may be executed by the one or more processors. In addition, each device may include a communication system such as a radio or other provisions for communicating using one or more communication methods. In particular, communication system includes provisions for communicating with other nearby devices and/or cloud server over a network. For example, each communication system could include a Wi-Fi radio, a Bluetooth radio, other NFC components, and/or a cellular network radio. Each local computing device can include provisions for communicating with, and processing information from, a cloud-based server as well as other devices in a home network.

As will be discussed in greater detail below, in different embodiments, the end-user 210 can, when desiring additional security with respect to his/her visitors, select a verification process to be employed for the purpose of verifying the identification of the visitor (e.g., representative of merchant 220). The app 230 can include or have access to a verification module 240, which is configured to offer one or more verification options to the end-user (see, for example, FIGS. 4 and 5). In different embodiments, when (or after) the appointment is scheduled, the consumer user interface 214 can present options from verification module 240 such as a request for the system to require that the visitor to present an encryption key, QR or bar code, or verification image.

Referring to FIGS. 2B and 2C, in some embodiments, the end-user 210 can be informed that the visitor is for a merchant that will have the merchant's unique identification signal for presentation. In such cases, the end-user 210 may opt-out of the verification module options, and rely only on the pre-registered signal that will be automatically confirmed by reference to an ID signal database 288 for secure scheduling and verification system ("system") hosted on a cloud network server when the visitor transmits the signal at the time of the visit, as shown in FIGS. 2B and 2C.

As will be discussed in the examples below, various types of verification tokens can be generated and/or requested by the system. In cases where the end-user 210 requests the implementation of an encryption key, an encryption key generator 242 can generate the key that is delivered to the visitor 290 as a first token 292 for presentation at the time of the visit. In cases where the end-user 210 requests the implementation of a QR or bar code, a code generator 244 can generate the code that is delivered to the visitor 290 as a second token 294 for presentation at the time of the visit. In cases where the end-user 210 requests the implementation of a verification image, the selected image from either an image library 246 or uploaded image data 248 can be delivered to the visitor 290 as a third token 296 for presentation at the time of the visit.

In different embodiments, upon the arrival of visitor 290 at the residence or other structure, a local security device system ("local device") 252 installed on the premises will be triggered to capture one or more data types from either the visitor 290 (e.g., a hard copy of the code or verification image) or from the visitor computing device 288 (e.g., encryption key, virtual copy of the code or verification image). Although the local device is typically installed near the front door of a home or main door of a building, in other embodiments, the local device can be installed at an outer gate or perimeter of the structure.

In some embodiments, presentation from the visitor computing device 280 can occur via a display 282 or other signal emitter 284 such as a radio emitter, speaker, NFC-components, or other output component. In one example, the identification signal can comprise a specific image or sound. For example, the visitor computing device 280 can include a speaker and produce a particular audio that triggers recognition by match determination module 270 of system 260. In another embodiment, the visitor 290 can wear or otherwise present tags or stickers with codes that, when captured by a camera 254 of the local device 252, can be used to identify the person. Camera 254 includes a device for capturing images and other light-based data. Camera 254 may comprise any kind of camera, including any kind of digital camera, as well as a camera configured to capture infrared, x-ray, ultraviolet, and visible light signals.

Furthermore, in different embodiments, the various tokens (292, 294, 296) if selected by the end-user, or required as a default setting or preference of the user, can be presented at the time of the visit and received by the local device 252, such as by camera 254 or another input component (e.g., microphone, radio receiver, NFC components, etc.). The verification input is prepared by an input processor 256 and transmitted to the system 260 via communication module 258 over network 250C. In one example, network 250C is the 'home' network for the residence. The local device 252 is configured to connect directly to the system 260 over the network 250C to initiate the verification process when a visitor is detected.

In some embodiments, the input data corresponds to image data. Image processing can be performed at the local device 252 and/or by the system 260 prior to being received by the match determination module 270. Image processing algorithms and/or software may be employed for pre-processing and processing of the captured image data. In one embodiment, the image processing algorithms perform compression, artifact correction, noise reduction, color corrections, geometric corrections, imager non-uniformity correction, etc., and various image processing enhancement operations on the image content captured by the camera 254 of the local device 252. The image processing algorithms are numerical and symbolic algorithms for the manipulation of images and video streams captured by the camera 254. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms.

Image processing may also include machine learning techniques that can be used to discriminate between features and to identify objects, for example via image recognition and object detection software. Such techniques may also include machine vision algorithms that perform, among other operations, digit recognition, printed and handwritten text recognition, symbol, logo and watermark recognition, and general shape recognition, as well as object classification. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. For example, texture detectors and edge detectors known to those skilled in the art may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™' Some non-limiting examples of object detection algorithms include R-CNN, SPP, Fast R-CNN, Faster R-CNN, Feature Pyramid networks, RetinaNet (Focal loss), Yolo Framework—Yolo1, Yolo2, Yolo3, and SSD.

As shown in FIG. 2B, match determination module 270 can receive a verification request from the local device 252 and confirm whether (a) a valid encryption key is present via decryption of encrypted content 272, (b) a valid code is present via code validator 274, (c) a valid verification image is present via image verifier 276, and (d) a valid ID signal is present with reference to ID signal database 288. In some other cases, the system can be configured to also or only detect the presence of company logos or wording on the person or associated vehicle/equipment and identify the logo (and company category) with reference to a logo database 278 using image recognition software. Company categories can include but are not limited to healthcare, lawn and garden, canvassing, marketing, surveying, retail, unknown, home maintenance, security, social services, repair, etc.

In some embodiments, the match determination module 270 can be in communication with a scheduled deliveries knowledge repository ("repository"). In one example, the repository is part of or accessible by scheduling module 238. The appointment data 236, for example, describes the date and time of the appointment, and can confirm whether the visitor 290 is 'expected' via a calendar alignment module 262. In another example, the logo and identified company can be compared to the name of the company that was scheduled to visit at that time, to ensure they are the same.

Once the system 260 determines whether the verification tokens are valid and match, and/or which company the logo or id signal are linked to (and whether the identified company matches the expected party based on the calendar appointment), the determination is sent to a notification module 264 which, based on user/default settings and preferences 266, is configured to generate an appropriate notification to the user computing device 212. In some embodiments, if an end-user has requested that the verified visitor have automated access to their building, an access component 268 can be activated that will trigger the security system for the building to unlock or open a door.

Figure 3A:
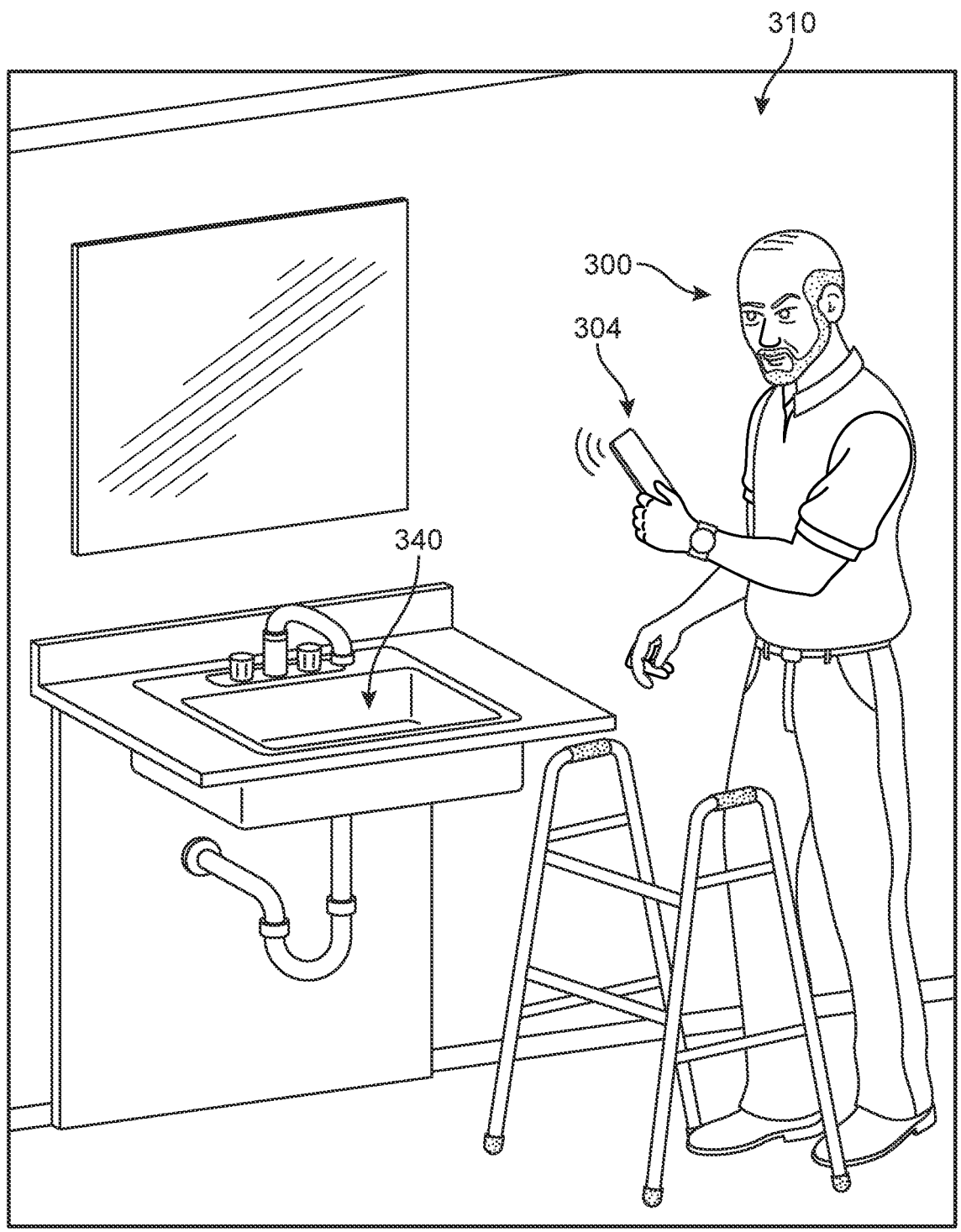
FIGS. 3A and 3B show an example of a resident accessing a scheduling application from a mobile device, according to an embodiment.
Figure 3B:
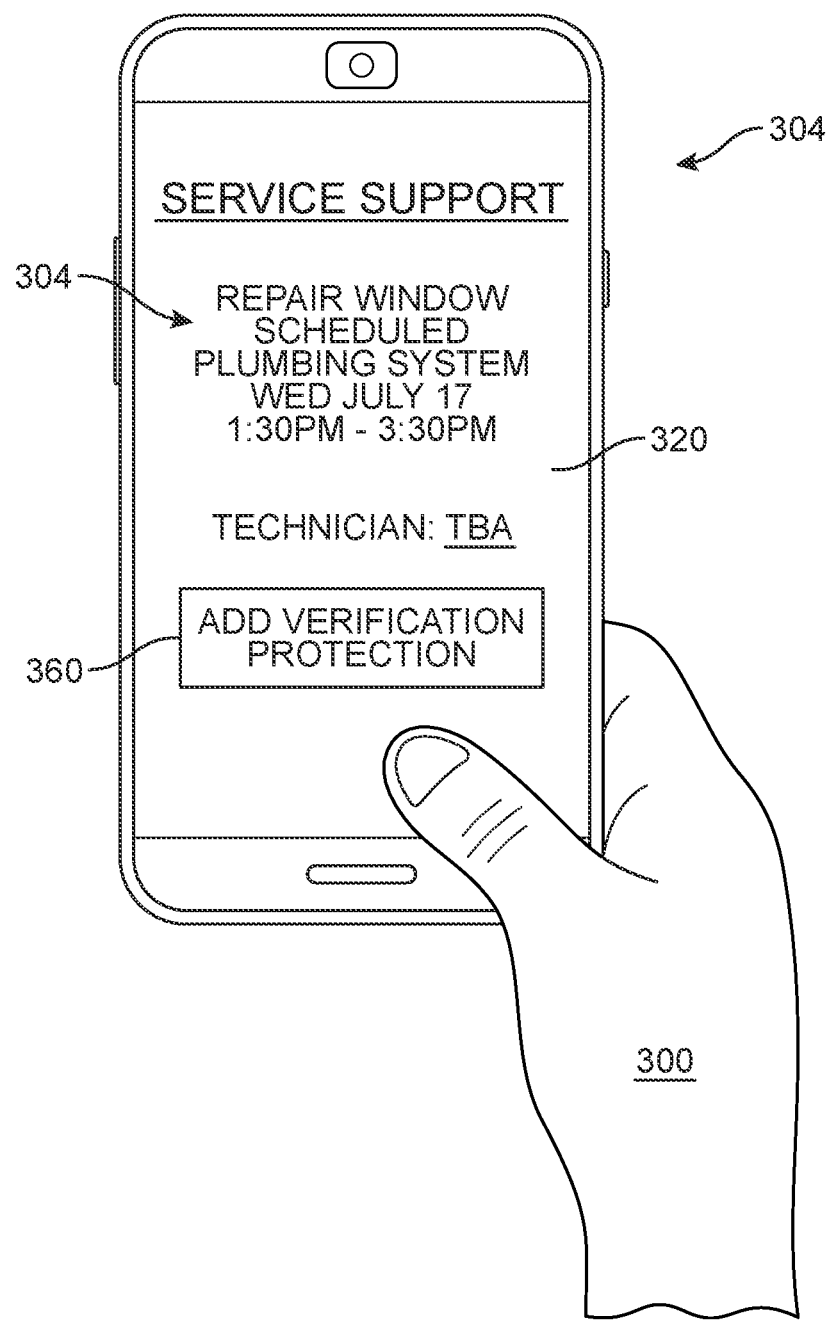

In FIG. 3A, a resident 300 is shown in a bathroom 310 examining his sink 340. Discovering a problem with the drain, he opens his mobile phone 304 to schedule an appointment with his preferred plumbing company. In some embodiments, as shown in FIG. 3B, the system can provide a secure scheduling app 320 through which various participating vendors or service persons (also referred to herein as market participants) can offer their services. In other examples, the vendor may on their own website offer a link to the secure scheduling app 320 and/or some of its features may be embedded in the website, as discussed with reference to FIG. 2 above. In another example, an external on-demand marketplace (e.g., akin to sites for OpenTable®, Angi®, Yelp®, Airbnb®, etc.) can implement the proposed features by integrating or embedding the service components into their own platform.

In the example of FIG. 3B, the resident 300 may select a repair service from a list of market participants in that area and plumbing service category. The resident 300 further selects or accepts a proposed time and date as appointment 350 ("Repair window scheduled/Plumbing System/Wed July 17/1:30 PM—3:30 PM/Technician: TBA"). The marketplace service then schedules an appointment for the user. In some embodiments, the app 320 can be configured to send information about the appointment to the user's device or service provider device. The appointment 350 can include various details such as the purpose for the visit (e.g., repair of sink), the general category of service (e.g., plumbing system), the time/date of the visit (e.g., Wed July 17 between 1:30 and 3:30 pm), and the name of the service person (e.g., in this case, one has not yet been assigned). In other examples, the person may be identified by name or another identifier for the user's convenience. In some embodiments, the app 320 can include an option to review, manage, or create new appointments directly through the app 320. In this case, the app 320 further presents an option 360 for activating or employing an additional layer of security for their appointment.

Figure 4:
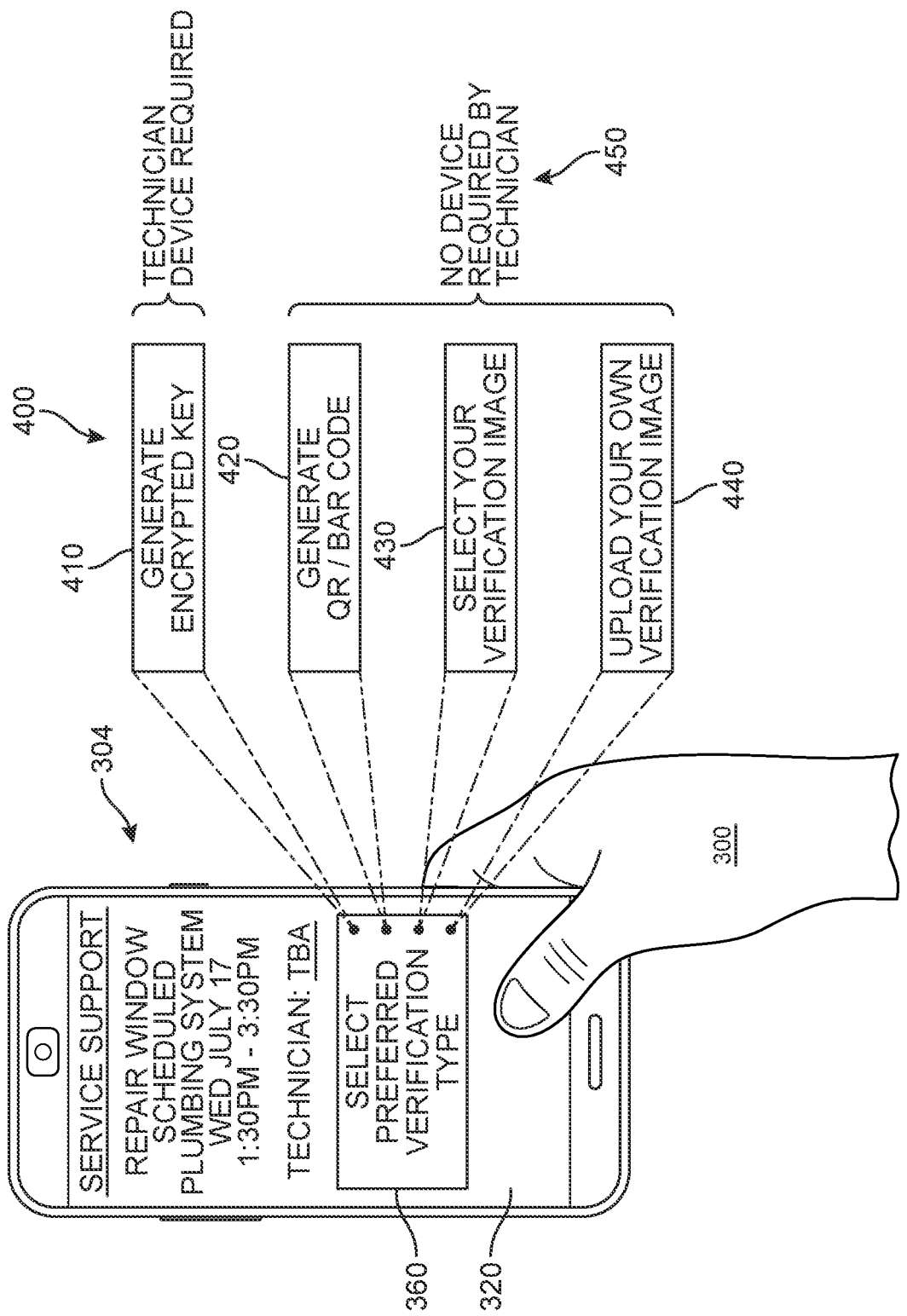
FIG. 4 is an example of the scheduling application offering multiple options for verification of the potential visitor attending the appointment, according to an embodiment.

Referring to FIG. 4, it can be understood that selection of option 360 can cause the app 320 to present one or more further options for secure verification (i.e., verification tokens). In this case, four security options 400 are shown, including a first option 410, a second option 420, a third option 430, and a fourth option 440. The first option 410 ("Generate Encrypted Key") is configured to create an encryption key that will be transmitted to the service provider's account. From there, the service provider (or the technician employed by them) will have access to the key for presentation at the time of their visit. In some embodiments, the encryption key is only accessible during the window of the appointment. In such cases, the technician would be required to carry a mobile computing device in order to convey the key to the security device at the user's home. In addition, in some embodiments, the key is only available to those visitors who have the security app 320 installed on their device and have a verified account with the security service where their appointments and security tokens are stored and/or managed. Presentation of the key will cause the system to automatically and immediately recognize and verify the caller, without query to the database. In some embodiments, the key can also be used to automatically grant temporary or time-limited access to the premises.

The second option 420 ("Generate QR/Bar Code") is configured to produce a QR or bar code that can be used by the technician to identify themselves. In different embodiments, if the user selects this option, the system is configured to generate a unique QR (or bar) code that is allocated to a specific appointment time and location. The visitor or vendor who receives the QR code (e.g., in an email invite, SMS, through the app 320, etc.) can 'check-in' for their appointment upon arriving at the building near the security device. These codes can also be time-limited, such that they are only valid for the appointment time. In some embodiments, the codes can be added into Apple Wallet® or Google Pay® for the visitor's convenience. In one embodiment, the QR/Bar code stored on the visitor's device can be "Geo Fenced" to the site they are visiting. As an example, when the visitor is within 10 meters of the building, the code-based pass will pop-up on their phone screen. The security device system is configured to recognize the code as valid for the appointment time, and thereby cause the system to automatically and immediately verify the caller, without query to the database.

The third option 430 ("Select your verification image") and fourth option 440 ("Upload your own verification image") involve the selection of an image, icon, photo, passcode, logo, or any other alphanumeric expression or graphic that can be shared with the visitor. In some embodiments, with third option 430 the resident 300 may be offered a plurality of images or other visual tokens via app 320. The resident 300 selects the image and the system automatically transmits the image to the technician. The image can be presented upon arrival via a device display at the house to verify their identity. Similarly, the fourth option 440 allows the resident 300 to select an image, but in this case, the resident 300 is able to upload an image from their own photo library. This image is given to the technician for presentation upon arrival on the device display.

In addition, as noted in FIG. 4, while an encryption key requires the visitor to bring along a computing device, the remaining three options can in some cases be configured for presentation in hard-copy format. In other words, the QR code, barcode, and verification image (along with the encryption key, referred to collectively as verification tokens) can also be printed out and carried with the caller bypassing the need for a computing device. The printout would then be presented directly to the camera of the security device for example on a paper, or as part of their temporary identification badge for their person or vehicle. In another example, the camera could be oriented and include a wide-angle lens allowing for detection of the verification token from a distance (e.g., as the caller enters the driveway), allowing for a relatively earlier notification to the occupants.

Figure 5:
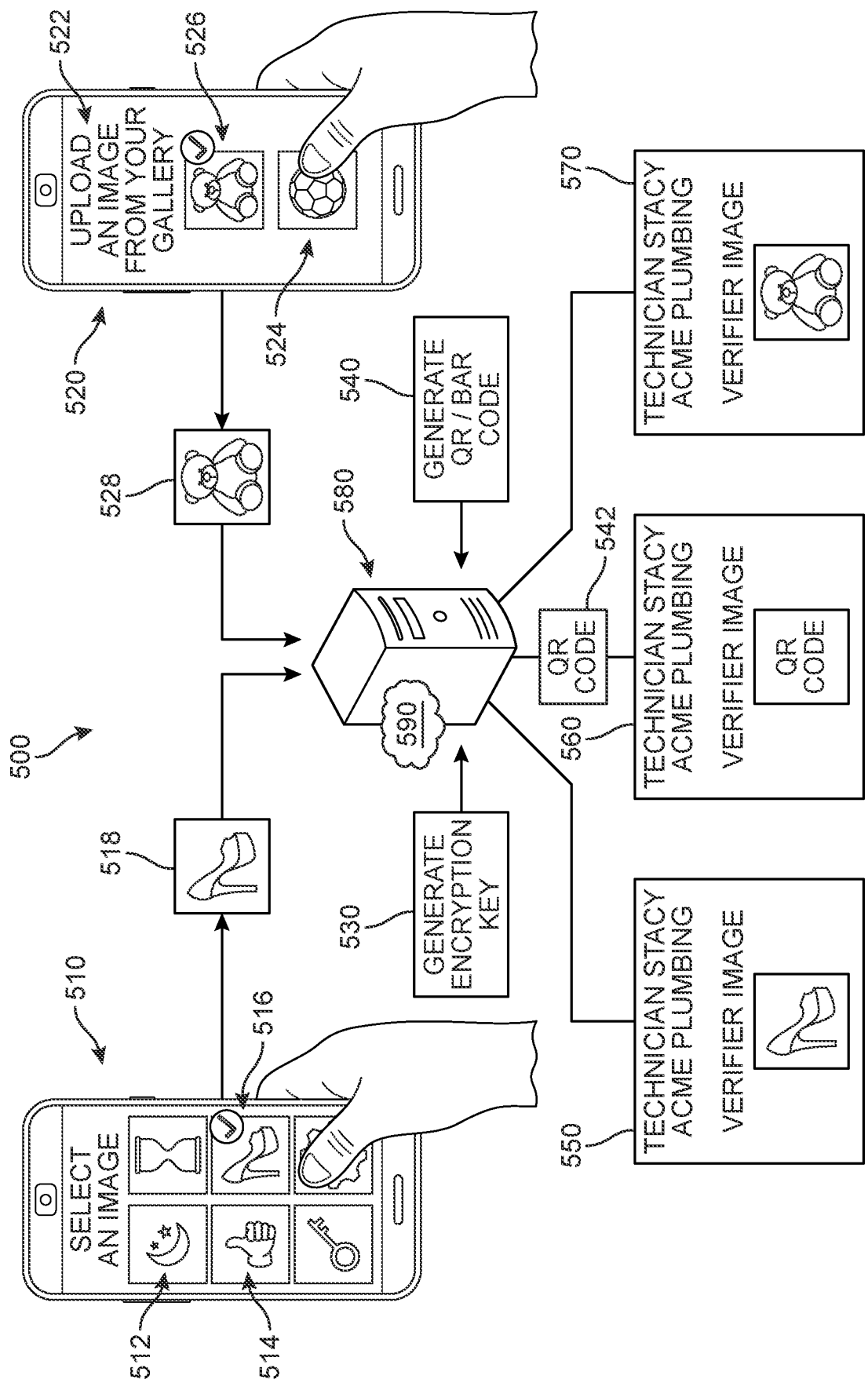
FIG. 5 is a schematic flow diagram presenting examples of verification processes that can be implemented via the scheduling application, according to an embodiment.

An example depicting how some aspects of each of the options 400 can be executed is presented schematically in the flow diagram 500 of FIG. 5. In the first process, a first smartphone 510 is used to access a first instance 512 of the security app, and the option for selecting a verification image from a library of images 514 is implemented. The user selects a shoe 516, which is stored and transmitted as a first verification image ("first image") 518 and shared with security service 580 via network 590. The service 580 can then relay first image 518 to the technician. In some embodiments, the first image 518 can be combined with the technician's credentials, such as a name, company, etc. In one example, a first virtual badge 550 may be generated that includes the information for verification. In some embodiments, the badge may be printed for display on the vehicle or person.

In the second process, a second smartphone 520 is used to access a second instance 522 of the security app, and the option for uploading a verification image from user's photo library 524 or other external source is implemented. The user selects a picture of a teddy bear 526, which is stored and transmitted as a second verification image ("second image") 528. The service 580 can then relay second image 528 to the technician. In some embodiments, the second image 528 can be combined with the technician's credentials, such as a name, company, etc. In one example, a second virtual badge 570 may be generated that includes the information for verification. In some embodiments, the badge may be printed for display on the vehicle or person.

In the third process, the user opted for an encryption key. A first request 530 to generate the encryption key is transmitted to the security service 580 via network 590. The encryption key will be created by service 580 and shared with the technician, who will present the key as discussed above. In the fourth process, the user opted for a QR or Bar code ("code"). The service 580 can then generate a unique code 542 which is relayed to the technician (via the app, email, text, etc.). In some embodiments, the code 542 can be combined with the technician's credentials, such as a name, company, etc. In one example, a third virtual badge 560 may be generated that includes the information for verification. In some embodiments, the badge may be printed for display on the vehicle or person.

Figure 6:
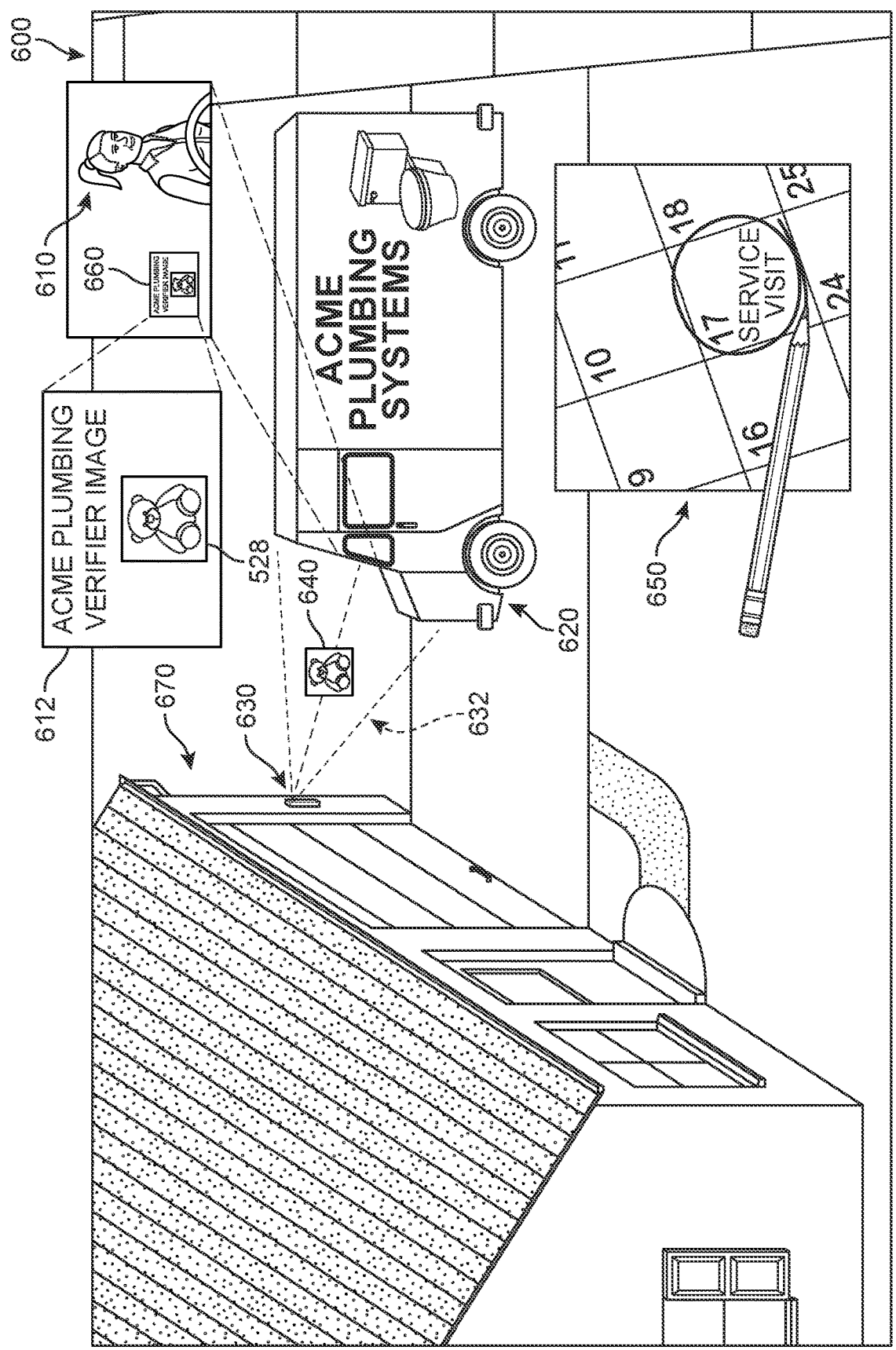
FIG. 6 is an illustration of a repair person arriving at a residence with a placard showing a verification token, according to an embodiment.
Figure 7:
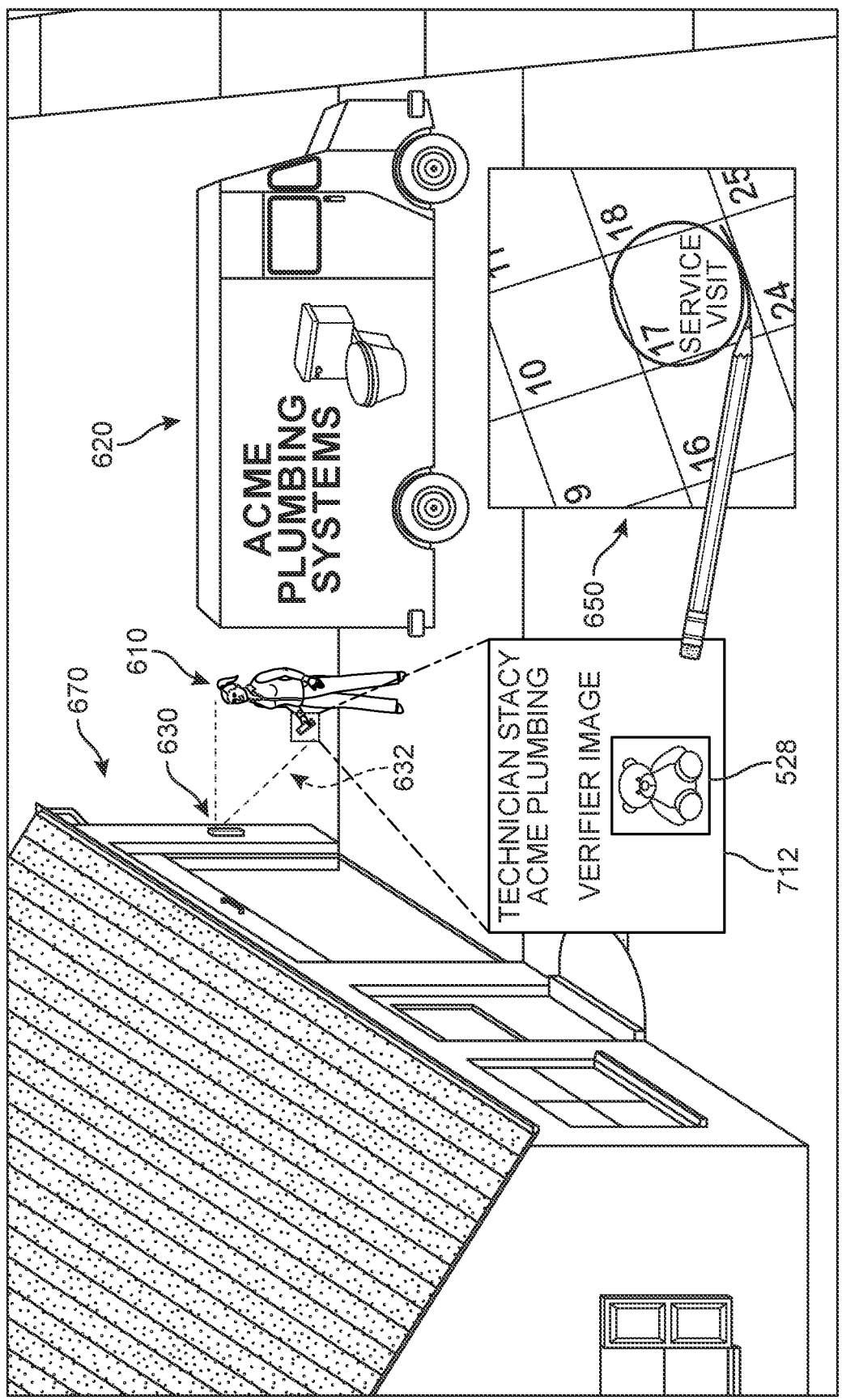
FIG. 7 is an illustration of a repair person arriving at a residence with a mobile computing device showing a verification token, according to an embodiment.

Referring to FIGS. 6 and 7, two examples of verification based on a verification image are shown. In a first scenario 600 of FIG. 6, a technician 610 arrives at residence 670 in a company vehicle 620. The technician's arrival coincides with a previously scheduled appointment 650 (see FIG. 3B). In addition, as she drives up the driveway, a security device 630 mounted on one side of the garage scans a zone 632. Such scanning can be performed continuously, or in response to a motion detection event. In a front cabin 660 of the vehicle 620, a placard 612 has been propped against the forward windshield. The placard 612 can be hard-copy, such as a paper, card, or board, or a display monitor that presents the placard 612 virtually upon arrival at residence 670. As the vehicle 620 comes in range of zone 632, the system captures image data 640 and checks whether the image includes the pre-selected second verification image 528. The system concludes the correct image has been shown and notifies the resident accordingly. In some embodiments, the system is configured to show the resident the verification image to provide assurance that this visitor is connected to the expected appointment. In one embodiment, the verification image can be used to enable automated access to the residence for a limited time.

Figure 8:
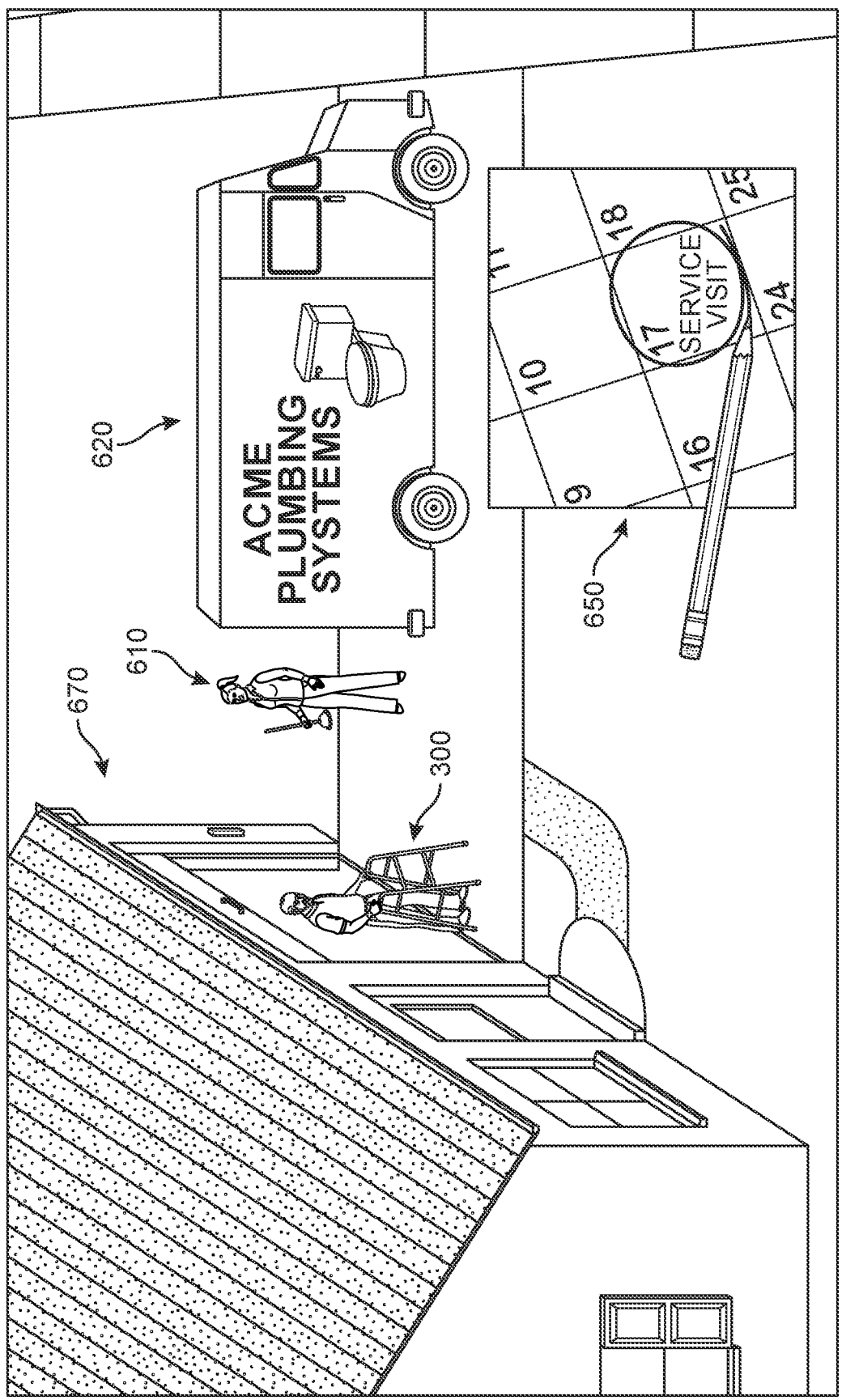
FIG. 8 is an illustration of the resident greeting the repair person following the automatic successful verification, according to an embodiment.

In a second, alternate scenario 700 of FIG. 7, the technician 610 arrives at residence 670 at a time that coincides with the previously scheduled appointment 650 (see FIG. 3B). In addition, as she exits her vehicle 620 and walks up the driveway, the security device 630 mounted on one side of the garage scans zone 632. In this case, the technician 610 is holding a verification badge 712 on her person. The verification badge 712 can be hard-copy, such as a paper, card, or board, or shown on a mobile device display monitor that presents the verification badge 712 virtually upon arrival at residence 670. As the technician 610 comes in range of zone 632, the system captures image data and checks whether the image includes the pre-selected second verification image 528. The system concludes the correct image has been shown and notifies the resident accordingly. In some embodiments, the system is configured to show the resident the verification image to provide assurance that this visitor is connected to the expected appointment. In one embodiment, the verification image can be used to enable automated access to the residence for a limited time. Thus, the verification process allows for flexibility and convenience for both the resident and the visitor. As shown in FIG. 8, upon receiving the notification, the resident 300 has emerged from the garage to greet the technician 610. Based on the notification, the resident 300 is assured that the technician 610 is in fact a legitimate representative of the company which he had hired and scheduled for plumbing repair and that he can safely greet her.

Figure 9:
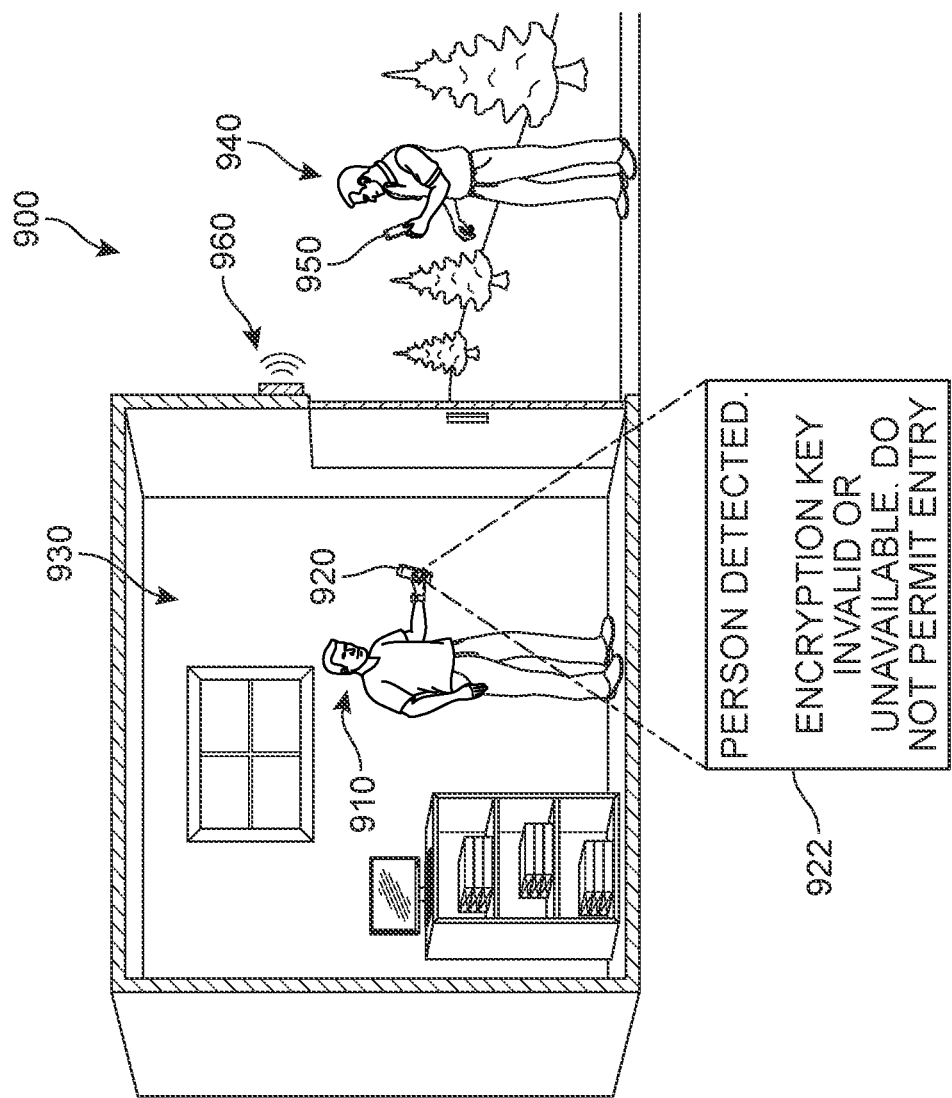
FIG. 9 is an illustration of an occupant in a building receiving a notification warning of a potential illegitimate visitor, according to an embodiment.

A third scenario 900 is shown in FIG. 9. In this illustration, an occupant 910 of a building 930 is carrying mobile phone 920 at work. He receives a notification 922 ("Person detected. Encrypted key invalid or unavailable. Do not permit entry") that alerts him to the presence of a potential intruder 940. The intruder 940 is attempting to gain access to the building 930, for criminal or solicitation purposes, but security device 960 determines that his computing device 950 does not have the correct encryption key. The occupant 910 who would otherwise be open to visitors, is reminded that he is only authorized to open the building 930 to those who have been verified. Such a process can also help thwart persons who may be attempting to enter using an encryption key for another person's residence.

Figure 10:
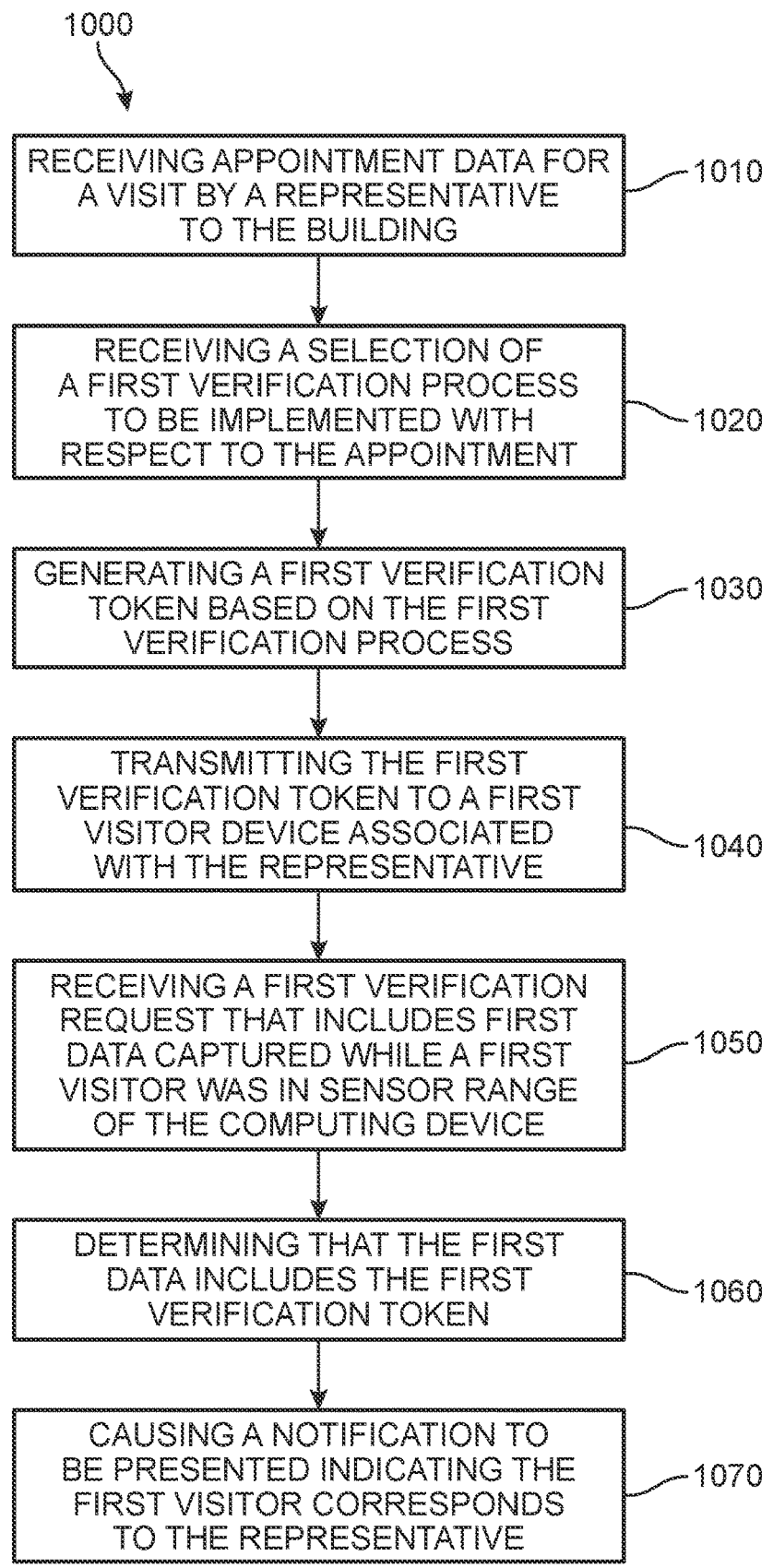
FIG. 10 a flow chart depicting a method of improving security for occupants of a property using an automated verification process, according to an embodiment.

FIG. 10 is a flow chart illustrating an embodiment of a method 1000 of improving security for occupants of a property using an automated verification process is disclosed. A first step 1010 includes receiving, at a cloud-based secure scheduling system and from a first computing device for an occupant of a building, appointment data identifying an appointment scheduled for a visit by a representative of a first service provider to the building. The method 1000 also includes a second step 1020 of receiving, at the secure scheduling system and from the first computing device, a selection of a first verification process to be implemented with respect to the appointment, and a third step 1030 of automatically generating, at the secure scheduling system, a first verification token based on the selection of the first verification process. In addition, the method 1000 includes a fourth step 1040 of transmitting, from the secure scheduling system, the first verification token to a first visitor device associated with the first service provider, and a fifth step 1050 of receiving, at the secure scheduling system and from a second computing device installed at the building, a first verification request that includes first data captured at a first time by (e.g., a camera or other sensor device of) the second computing device while a first visitor was in sensor range of the second computing device. A sixth step 1060 includes determining, at the secure scheduling system, that the first data includes the first verification token, and a seventh step 1070 includes causing, via the secure scheduling system, a notification to be presented at the first computing device, the notification including a message indicating the first visitor corresponds to the representative.

In different embodiments, the method 1000 may include additional steps or aspects. In one embodiment, the first verification token is one of an encryption key, QR code, bar code, identification signal, and verification image. In some embodiments, the method 1000 also includes steps of causing to be presented, via the secure scheduling system and at the first computing device, a plurality of images, and receiving, at the secure scheduling system, a selection of a first image from the plurality of images, where the first verification token includes the first image. In another embodiment, the method 1000 further includes a step of receiving, at the secure scheduling system, an uploaded first image from the first computing device, wherein the first verification token includes the first image. In one embodiment, the first data includes an image of the first verification token that was displayed on a screen of a computing device associated with the visitor, and in another embodiment, the first data includes an image of the first verification token that was printed on paper.

In different embodiments, the method 1000 also includes a step of determining, at the secure scheduling system and based on the appointment data, the first time occurs during the first duration, where the message further confirms the first service provider was scheduled to visit at the current time. In some examples, the method 1000 also includes a step of determining, at the secure scheduling system and based on the appointment data, the first time occurs outside of the first duration, where the message further warns that the first service provider is not scheduled to visit at the current time and the visitor may be illegitimate.

In another example, the method 1000 can further include steps of receiving, at the secure scheduling system and from the second computing device, a second verification request that includes second data captured at a second time by the second computing device while a second visitor was in sensor range of the second computing device, determining, at the secure scheduling system, that the second data fails to include the first verification token, and thereby causing, via the secure scheduling system, a notification to be presented at the first computing device, the notification including a message warning that the second visitor may be illegitimate. In another embodiment, the method 1000 also includes a step of causing, from the secure scheduling system and via the second computing device, access to the building to be automatically granted to (and enabled for) the first visitor (e.g., unlocking doors, opening garage, opening gate, etc.

Other methods may be contemplated within the scope of the present disclosure. For example, in some embodiments, a method of identifying visitors to a building is disclosed. The method includes a first step of receiving, at a secure verification system, a first image of a visitor captured by a camera of a first computing device installed on a first property at a first time, and a second step of recognizing, using image recognition software at the secure verification system, a first identification badge in the first image. A third step includes detecting, at the secure verification system, a logo displayed on the first identification badge, and a fourth step includes identifying, at the secure verification system, a first service provider associated with the logo. A fifth step includes causing, via the secure verification system, a notification to be presented at a second computing device associated with an occupant of the first building, the notification including a message identifying the first service provider.

In other embodiments, this method may include additional steps or aspects. In one example, the message further includes an identification of a company category for the first service provider. In one embodiment, the method includes further steps of receiving, at the secure verification system, appointment data for an appointment between the occupant and the first service provider for a first duration (i.e., window of time), and determining, at the secure verification system and based on the appointment data, the first time occurs during the first duration, where the message further confirms the first service provider was scheduled to visit at the current time. In some embodiments, the method also includes steps of receiving, at the secure verification system, appointment data for an appointment between the occupant and the first service provider for a first duration, and determining, at the secure verification system and based on the appointment data, the first time occurs outside the first duration, where the message further warns that the first service provider is not scheduled to visit at the current time and the visitor may be illegitimate. In other embodiments, the method can further include steps of receiving, at the secure verification system, appointment data for an appointment between the occupant and a second service provider for a first duration, and determining, at the secure verification system and based on the appointment data, the first time occurs during the first duration, where the message further warns that an identity of the first service provider and an identity of the second service provider differ, and the visitor may be illegitimate. In some embodiments, the method includes querying an online or local database for an image similar to that of the identification badge. In one example, the method also includes determining whether the person is authorized to enter the property based at least in part on an identifying characteristic of the person.

Light, RF, or other types of signals generated applying one or more of the techniques disclosed herein may be produced by a light emitter, radio emitter or other output device. In some embodiments, the output device may be coupled directly to the system or processor generating the signal. In other embodiments, the output device may be coupled indirectly to the system or processor such as via a network. Examples of such networks include the Internet, mobile telecommunications networks, a WIFI network, as well as any other wired and/or wireless networking system. When the output device is indirectly coupled, the signal generated by the system or processor may be recorded over the network to the server or other computing device. Such records allow applications and other software which track, monitor, or otherwise manage drone deliveries to receive pertinent data.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, smart watches, smart glasses, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

I claim:

1. A method of improving security for occupants of a property using an automated verification process, the method comprising:
   receiving, at a cloud-based secure scheduling system and from a first mobile computing device associated with an occupant of a building, appointment data identifying an appointment scheduled for a visit to the building by a representative of a first service provider;
   receiving, at the secure scheduling system and from the first mobile computing device, a selection of a first verification photo from among a plurality of photos stored in a photo library on the first mobile computing device;
   automatically generating, at the secure scheduling system, a first verification token based on the selection of the first verification photo;
   transmitting, from the secure scheduling system, the first verification token to a first visitor device associated with the first service provider;
   receiving, at the secure scheduling system and from a second computing device installed at the building, a first verification request that includes first data captured at a first time by the second computing device while a first visitor was in sensor range of the second computing device;
   determining, at the secure scheduling system, that the first data includes the first verification token; and
   causing, via the secure scheduling system, a notification to be presented at the first mobile computing device, the notification including a message indicating the first visitor corresponds to the representative.

2. The method of claim 1, wherein the first verification token includes the first verification photo in combination with credential information associated with the first service provider.

3. The method of claim 1, further comprising:
   generating a badge that includes the first verification photo and is printed for display on a vehicle associated with the representative of the first service provider.

4. The method of claim 1, wherein the first data includes an image of the first verification token that was displayed on a screen of the first visitor device.

5. The method of claim 1, wherein the first data includes an image of the first verification token, including the first verification photo, that was printed on paper.

6. The method of claim 1, wherein
   the appointment data further includes data describing a first duration time period for the appointment; and
   the method further comprising determining, at the secure scheduling system and based on the appointment data, the first time occurs during the first duration, wherein the message further confirms the first service provider was scheduled to visit at the current time.

7. The method of claim 1, wherein
   the appointment data further includes data describing a first duration time period for the appointment; and
   the method further comprising determining, at the secure scheduling system and based on the appointment data, the first time occurs outside of the first duration, wherein the message further warns that the first service provider is not scheduled to visit at the current time and the visitor may be illegitimate.

8. The method of claim 1, further comprising:
   receiving, at the secure scheduling system and from the second computing device, a second verification request that includes second data captured at a second time by the second computing device while a second visitor was in sensor range of the second computing device;
   determining, at the secure scheduling system, that the second data fails to include the first verification token; and
   causing, via the secure scheduling system, a notification to be presented at the first computing device, the notification including a message warning that the second visitor may be illegitimate.

9. A method of identifying visitors to a building, the method comprising:
   receiving, at a secure verification system, a first user selected photo that is selected from a plurality of photos in a photo library on a mobile computing device associated with a first user;
   receiving, at the secure verification system, a first image of a visitor captured by a camera of a first computing device installed on a first property at a first time;
   recognizing, using image recognition software at the secure verification system, a first identification badge in the first image;
   detecting, at the secure verification system, a logo displayed on the first identification badge;
   identifying, at the secure verification system, a first service provider associated with the logo;
   detecting, at the secure verification system, that the first identification badge includes the first user selected photo; and
   causing, via the secure verification system, a notification to be presented at a second computing device associated with an occupant of the first building, the notification including a message identifying the first service provider.

10. The method of claim 9, wherein the message further includes an identification of a company category for the first service provider.

11. The method of claim 9, further comprising:
    receiving, at the secure verification system, appointment data for an appointment between the occupant and the first service provider for a first duration; and
    determining, at the secure verification system and based on the appointment data, the first time occurs during the first duration,
    wherein the message further confirms the first service provider was scheduled to visit at the current time.

12. The method of claim 9, further comprising:
    receiving, at the secure verification system, appointment data for an appointment between the occupant and the first service provider for a first duration; and determining, at the secure verification system and based on the appointment data, the first time occurs outside the first duration, wherein the message further warns that the first service provider is not scheduled to visit at the current time and the visitor may be illegitimate.

13. The method of claim 9, further comprising:

receiving, at the secure verification system, appointment data for an appointment between the occupant and a second service provider for a first duration; and determining, at the secure verification system and based on the appointment data, the first time occurs during the first duration, wherein the message further warns that an identity of the first service provider and an identity of the second service provider differ, and the visitor may be illegitimate.

14. A system for improving security for occupants of a property using an automated verification process, the system comprising a processor and machine-readable media including instructions which, when executed by the processor, cause the processor to:

receive, at a cloud-based secure scheduling system and from a first mobile computing device associated with an occupant of a building, appointment data identifying an appointment scheduled for a visit by a representative of a first service provider to the building;

receive, at the secure scheduling system and from the first mobile computing device, a selection of a first verification photo from among a plurality of photos stored in a photo library on the first mobile computing device;

automatically generate, at the secure scheduling system, a first verification token based on the selection of the first verification photo;

transmit, from the secure scheduling system, the first verification token to a first visitor device associated with the first service provider;

receive, at the secure scheduling system and from a second computing device installed at the building, a first verification request that includes first data captured at a first time by the second computing device while a first visitor was in sensor range of the second computing device;

determine, at the secure scheduling system, that the first data includes the first verification token; and cause, via the secure scheduling system, a notification to be presented at the first mobile computing device, the notification including a message indicating the first visitor corresponds to the representative.

15. The system of claim 14, wherein the first verification token includes the first verification photo in combination with credential information associated with the first service provider.

16. The system of claim 14, wherein the instructions further cause the processor to:

generate a badge that includes the first verification photo and is printed for display on a vehicle associated with the representative of the first service provider.

17. The system of claim 14, wherein the instructions further cause the processor to: generate a badge that includes the first verification photo and is printed for display on the representative of the first service provider.

18. The system of claim 14, wherein the first data includes an image of the first verification token that was displayed on a screen of the first visitor device.

19. The system of claim 14, wherein the first data includes an image of the first verification token, including the first verification photo, that was printed on paper.

20. The system of claim 14, wherein the instructions further cause the processor to:

receive, at the secure scheduling system, appointment data for an appointment between the occupant and the first service provider for a first duration; and determine, at the secure scheduling system and based on the appointment data, the first time occurs during the first duration, wherein the message further confirms the first service provider was scheduled to visit at the current time.

* * * * *